United States Patent [19]
Follett

[11] 3,830,252

[45] Aug. 20, 1974

[54] EXCESS FLOW RESPONSIVE SHUT-OFF VALVE

[76] Inventor: John L. Follett, 14554 Richmond Ave., Fair Haven, N.Y. 13064

[22] Filed: Jan. 11, 1973

[21] Appl. No.: 322,759

[52] U.S. Cl. ............................... 137/519.5, 251/65
[51] Int. Cl. ........................................... F16k 15/04
[58] Field of Search ......... 137/517, 519.5, 460, 519

[56] References Cited
UNITED STATES PATENTS

| | | | |
|---|---|---|---|
| 3,279,545 | 10/1966 | Page, Jr. | 137/519.5 X |
| 3,367,362 | 2/1968 | Hoffman | 137/519.5 X |
| 3,407,827 | 10/1968 | Follett | 137/519.5 X |

Primary Examiner—Robert G. Nilson
Attorney, Agent, or Firm—Charles S. McGuire

[57] ABSTRACT

A shut-off valve having a fixed seat and spherical closure element which are magnetically attracted to effect valve closure when the rate of flow therethrough exceeds a predetermined limit. The ball which moves to close the valve is carried on an annular support within a length of tubing which is spaced from the sides of a central opening in the valve body. Gas passing through the valve flows under the ball and outwardly to the space between the tubing and valve body, thence inwardly through a series of openings in the tubing adjacent the sides and top of the ball. The size and relative positioning of the holes in the tubing and the ball provide close control and repeatability of valve actuation.

9 Claims, 5 Drawing Figures

PATENTED AUG 20 1974　　　　　　　　　　　　　3,830,252

3,830,252

EXCESS FLOW RESPONSIVE SHUT-OFF VALVE

BACKGROUND OF THE INVENTION

The present invention relates to safety valves and, more particularly, to improvements in shut-off valves responsive to flow through the valve in excess of a predetermined limit.

Flow of volatile fluids through a supply line should be automatically and immediately shut off when the rate of flow reaches a point which indicates a leak or break at some point in the line. For this purpose, automatic shut-off valves responsive to the flow rate have been used. In general, however, such valves are often unreliable within desired tolerances, or otherwise unsuited for widespread use in such applications as domestic gas fuel lines.

It is a principal object of the present invention to provide an excess flow shut-off valve which is simple and economical in construction and highly repeatable at close tolerances of flow rate.

A further object is to provide an automatic shut-off valve wherein a predetermined flow rate moves a closure element to stop flow through the valve with the element remaining stable, and free from shatter or bounce, to the point of closure.

Another object is to provide a basic excess flow responsive valve structure which can easily be tailored to actuate at any desired flow rate, and remain highly stable and repeatable.

Other objects will in part be obvious and will in part appear hereinafter.

SUMMARY OF THE INVENTION

A fixed seat and movable closure element are provided in a valve body between inlet and outlet openings. The closure element may be in the form of a ball and may be magnetically held in engagement with the seat when the valve is closed. The ball is held on an annular support which is engaged between an externally threaded nut and a section of tubing. The opening in the valve body is internally threaded to receive the nut, and the outside wall of the tubing is spaced from the inner wall of the opening in the valve body.

A passageway is provided for the fluid between the nut and the ball support so that gas may flow into the space between the tubing and the valve body. A series of openings are provided in the tubing to allow flow to the inside thereof, and thence out of the outlet opening, around and above the ball. The size and positioning of the holes in the tubing, and the spacing between the ball and tubing, control the flow rate at which closure occurs. The manner of flow outwardly under the ball and back inwardly around and above the ball creates a pressure differential which stabilizes the ball to the point of closure. That is, the ball remains on its support without bounce or chatter as flow approaches the rate required for closure, and move immediately to the closed position upon reaching the predetermined excess flow.

DETAILED DESCRIPTION

Figure 1:
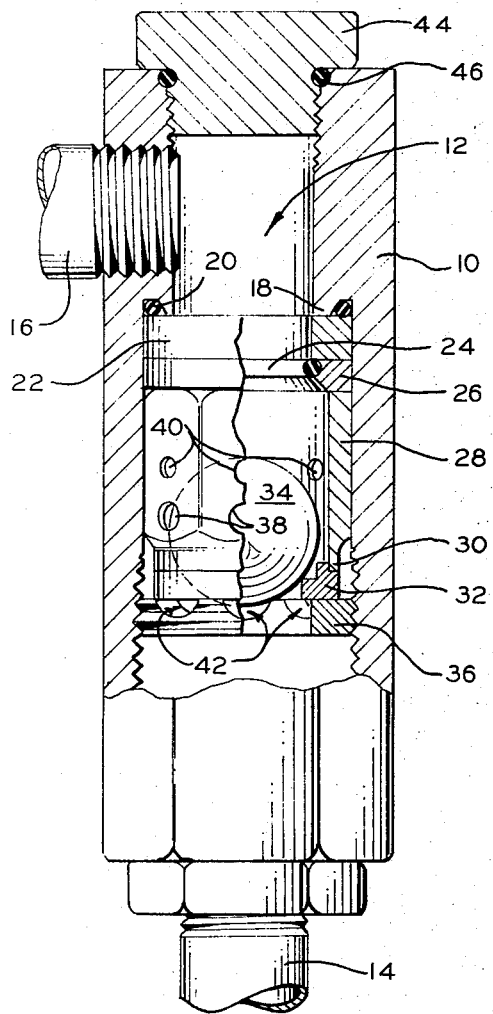
FIG. 1 is a front elevation, partly in half and quarter section, of a preferred embodiment.

Valve body 10, having central, longitudinal opening 12, is provided with threaded openings to accept inlet and outlet fittings 14 and 16, respectively. Within opening 12 is shoulder 18, surrounded by a recess for O-ring 20. Ring 22, of permanently magnetized material, is urged against shoulder 18 with O-ring 20 providing a positive seal.

The valve seat is provided by O-ring 24 which is retained between ring 22 and washer 26. A length of tubing 28, shown in FIGS. 1 and 2 as a section of metal stock having a hexagonal outer wall and cylindrical inner wall, is positioned in opening 12 with one end against washer 26. The other end 30 is necked down to a cylindrical shape on the outside as well as the inside.

Annular element 32 supports on its inner periphery ball 34 which acts as the valve closure element and is freely movable, being held on element 32 only by its own weight. An outer shoulder is provided on element 32 for engagement with end 30 of tubing 28. Externally threaded nut 36 is engaged with internal threads in opening 12 and holds element 32, tubing 28, washer 26 and ring 22 firmly in position. Nut 36 may be tightened or removed by engagement of a wrench with a slot in the lower side of the nut in conventional fashion.

One or more groups or series of openings are provided in tubing 28. In the illustrated embodiment, two such groups are shown and the tubing is formed of hex stock. One opening of each series of openings is provided in each of the six faces of the stock. The lower series of openings, denoted by reference numeral 38, is of larger diameter than upper series of openings 40. As best seen in FIG. 1, the lower edges of lower openings 38 are roughly adjacent the horizontal center of ball 34, and upper openings 40 are adjacent the top, when the ball is resting on support element 32.

Nut 36 is provided with depressions or cut-out areas 42 extending across its upper surface. Element 32 is of lesser diameter than opening 12, as is end 30 of tubing 28. The opposite outer edges of the hex stock are spaced only slightly less than the diameter of opening 12, whereby the faces of the hex stock which contain openings 38 and 40 are spaced from the inner wall of the opening in the valve body. Thus, gas may enter valve body 10 through inlet 14, flow through cut-out areas 42, upwardly around element 32 to the space between the outer walls of tubing 28 and the wall of opening 12, through openings 38 and 40, through the openings defining the valve seat, and out of the valve body through outlet 16.

As the gas flows through cut-out areas 42, being locked from passage through element 32 by the presence of ball 34, a lifting force is exerted on the ball commensurate with the rate of flow of the gas. The flow through openings 38 and 40 over the upper portion of ball 34 creates a force tending to equalize the lifting force, but when the flow reaches a predetermined limit the lifting force predominates and ball 34 is moved into engagement with O-ring 24. The valve is then closed, preventing further flow until the ball is moved back onto support element 32. The ball may be held in the closed position by gas pressure, as in FIG. 2, dropping back to element 32 by gravity when the pressure is sufficiently reduced, or retained in the closed position by magnetic attraction between the ball and ring 22, as in FIG. 1, requiring manual reset to move the ball back to the open position. In the illustrated embodiment, the upper end of opening 12 is closed by threaded plug 44 and sealed by O-ring 46, which may be removed to allow access to the ball for manual reset. This may be replaced by mechanism such as that shown in copending application Ser. No. 257,655, filed May 30, 1972, of the present inventor, to allow externally operated manual reset.

Figure 2:
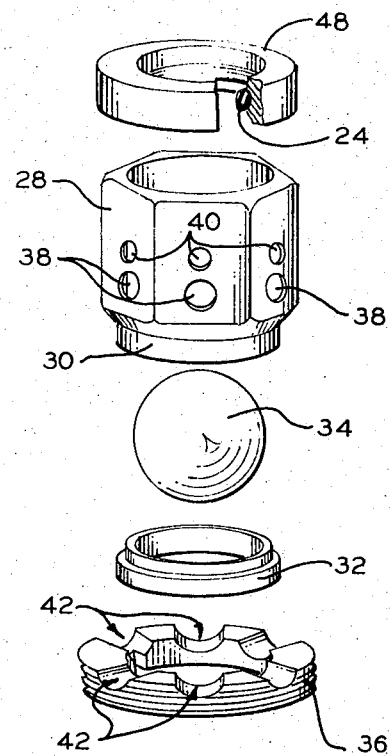
FIG. 2 is an exploded perspective view of certain elements of the valve of FIG. 1.

The elements illustrated in exploded perspective in FIG. 2 correspond to those in FIG. 1 except that ring 48, having a groove for receiving O-ring 24, replaces the two piece structure of ring 22 and washer 26. Ring 48 is of non-magnetized material, as is ball 34, whereby the ball will be held in the closed position only so long as the pressure of gas from beneath is sufficient to overcome the weight of the ball.

Figure 3:
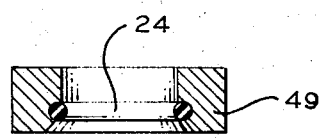
FIG. 3 is an elevation, in half section, of an alternate form of one of the elements of FIG. 1.
Figure 4:
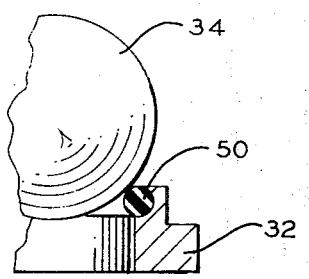
FIGS. 4 and 5 are fragmentary elevations, also in section, of other alternative forms of certain elements.
Figure 5:
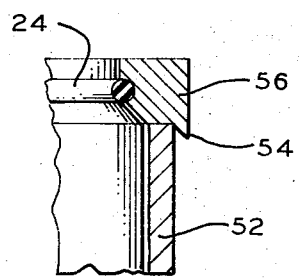

In FIG. 3, ring 49 is of permanently magnetized material, and provides a one-piece construction retaining the ball in the closed position until manually reset and holding O-ring 24. In FIG. 4, support element 32 is provided with O-ring 50, on which ball 34 rests, to absorb vibration and the like better than the metal-to-metal contact of the previous embodiment, thereby reducing sensitivity to vibration. Tubing 52 is cylindrical, rather than of hex stock, in the embodiment of FIG. 5, with flange 54 on non-magnetic ring 56 serving to align tubing 52 and hold it in spaced relation to the inner wall formed by the opening in the valve body. Openings are provided through tubing 52 in the same manner as the hex stock, and operation is otherwise the same.

The size and number of openings in the tubing surrounding the ball closure element, as well as the relative positions of the openings and ball when the latter is resting on its support, are determinative of the flow rate required to effect valve closure. It is important to note that the ball will move to the closed position when the flow rate reaches or exceeds the predetermined limits. Valve operation may be controlled within very close tolerances of flow rate, and is extremely repeatable within the same tolerances.

What is claimed is:

1. A safety shut-off valve interposed in a fluid line for automatic closure to stop fluid flow in response to a rate of flow in excess of a predetermined maximum, said valve comprising, in combination:
   a. a valve body having inlet and outlet openings with a fixed valve seat therebetween;
   b. a valve closure element positioned within an internal opening of said valve body between said inlet opening and seat;
   c. an annular support element positioned within said opening below said closure element and upon which the latter normally rests by gravity, a lower portion of said closure element being disposed in the direct path of fluid flowing between said inlet and outlet openings;
   d. a control element positioned between said closure element and the walls of said internal opening, at least portions of the outside of said control element being spaced from said walls and the entire inside of said control element being spaced from said closure element;
   e. a second annular element having external threads for engagement with internal threads in said valve body opening, said annular support element being held between said control element and said second annular element; and
   f. means directing the fluid flow within said internal opening from below said closure element into the space between the outside of said control element and said walls, thence into the inside of said control element and through said valve seat and outlet, including cut-out portions between the facing surfaces of said annular support element and said second annular element.

2. The invention according to claim 1 wherein said closure element is spherical, said walls of said internal opening are substantially cylindrical, and said control element comprises a length of tubing having one or more openings in the side to allow passage of fluid from the space between the outside of said control element and said walls into the inside of said control element.

3. The invention according to claim 2 wherein said tubing is hexagonal on the outside and cylindrical on the inside.

4. The invention according to claim 3 wherein one or more openings are provided through said tubing in each of the hexagonal faces thereof.

5. The invention according to claim 4 wherein the openings in said tubing are all above the horizontal centerline of said spherical closure element.

6. The invention according to claim 5 wherein a pair of openings are provided in each hexagonal face of said tubing, the upper openings of each pair being of smaller diameter than the lower openings.

7. The invention according to claim 1 wherein said annular support element includes a resilient O-ring upon which said closure element normally rests, thereby providing resistance to valve closure due to vibration.

8. The invention according to claim 1 wherein said valve seat includes means exerting a magnetic bias retaining said closure element in engagement with said valve seat upon movement to the closed position.

9. The invention according to claim 1 wherein the outside of said support element is spaced from the walls of said valve body opening and said cut-out portions are in the upper surface of surface second annular element.

* * * * *